United States Patent [19]

Stierlin et al.

[11] 4,176,529

[45] Dec. 4, 1979

[54] ABSORPTION REFRIGERATING UNIT

[75] Inventors: Hans Stierlin, Schlieren, Switzerland; John R. Ferguson, Grove Hill, England

[73] Assignee: Kühlapparate GmbH SIBIR, Switzerland

[21] Appl. No.: 939,218

[22] Filed: Sep. 5, 1978

[30] Foreign Application Priority Data

Sep. 7, 1977 [CH] Switzerland ..................... 10934/77

[51] Int. Cl.$^2$ ............................................. F25B 15/10
[52] U.S. Cl. ........................................ 62/490; 62/238; 62/239
[58] Field of Search ................ 62/490, 491, 492, 493, 62/238 B, 239

[56] References Cited

U.S. PATENT DOCUMENTS

| 3,760,602 | 9/1973 | Blomberg | 62/490 |
| 3,775,996 | 12/1973 | Blomberg | 62/490 |
| 3,802,219 | 4/1974 | Blomberg et al. | 62/490 |
| 3,851,497 | 12/1974 | Blomberg et al. | 62/490 |

*Primary Examiner*—Lloyd L. King
*Attorney, Agent, or Firm*—Ostrolenk, Faber, Gerb & Soffen

[57] ABSTRACT

A continuous cycle absorption refrigerating unit is disclosed. Means are provided for limiting the supply of coolant rich solution from an absorber vessel to the vapor forming end of the liquid heat exchanger of the thermosiphon pump whenever the refrigerating unit exceeds a permissible angle of inclination at which the pump is able to pump liquid whereby only a limited amount of inhibitor rich solution can be produced during the period of time during which the unit exceeds the permissible angle of inclination.

8 Claims, 2 Drawing Figures

ABSORPTION REFRIGERATING UNIT

BACKGROUND OF THE INVENTION

The present invention relates to a continuous cycle absorption refrigerating unit, intended in particular for refrigerators in vehicles, whose solution contains a corrosion inhibitor. In view of the various possible types of operation of absorption refrigerator units (electric heating or heating by combustion of gaseous or liquid fuels) this type of refrigerator finds extensive use in land and water vehicles.

In the case of the use of absorption refrigerating units which are installed permanently in vehicles, the unit may tilt with respect to the vertical by an amount which exceeds the inclination of the liquid-conducting tubes with respect to the horizontal. This results in a substantial accumulation of liquid in the liquid circuit outside an reservoir or absorber vessel 11 (see FIG. 1). As a result of this accumulation, the level 12 of the liquid in reservoir 11 drops. Furthermore, the height of the lower end of the thermosiphon pump 16 can change with respect to the original liquid level 12. Under such conditions, the inclination of the refrigerator has the effect of changing the depth of immersion of the pump 16. The maximum angle of inclination at which the thermosiphon pump 16 is still just able to pump liquid will be referred to hereinbelow as the "permissible angle of inclination". If the permissible angle of inclination of the refrigerator is exceeded, then the pump is no longer minimally immersed and only a vapor mixture of coolant and solvent is expelled from the pump. As a result, there is a considerable enrichment of the corrosion inhibitor in the remaining solution which leads to a substantial increase in the density of the solution. The high density solution drops to the lowest point in the forward path 13 and is replaced by solution rich in coolant. This solution, in turn, is subjected to the same evaporation process. If the unit is operated for a long time with an impermissible inclination, a solution of relatively low coolant content and extremely high inhibitor content will be located in the entire forward path 13. This solution has a higher boiling point and specific gravity than the solution which fills the path 13 during normal conditions. If these variables assume sufficiently high values, the pumping action of the pump is lost even after the unit is returned to a normal operating position. The main reasons for this are:

(a) The difference in the boiling points between the lean solution in the generator 1 and the solution contained in the vapor-producing end of the liquid heat exchanger 15 becomes so small that the heat transfer does not produce sufficient vapor to operate the thermosiphon pump.

(b) Due to the high density of the solution in the forward path 13, the communicating liquid level 21 in the vapor-forming end of the liquid heat exchanger 15 is lower than the liquid level 12 in the reservoir 11, which can also limit or prevent the pumping action of the pump.

The primary object of the present invention is to create a refrigerating unit which, even after it has been inclined for hours with an inclination greater than the permissible angle of inclination, can resume normal operation immediately after the unit is placed at an inclination which is less than the permissible value.

BRIEF DESCRIPTION OF THE INVENTION

The above and other objects of the present invention are achieved by providing the absorption refrigerating unit with at least one of the following structural modifications:

1. means for interrupting the supply of coolant rich solution from the reservoir to the vapor forming end of the liquid heat exchanger of the thermosiphon pump after the refrigerating unit exceeds the permissible angle of inclination such that only a limited amount of inhibitor rich solution can be produced during the period of time during which the unit exceeds the permissible angle of inclination;

2. means for storing the so produced inhibitor rich solution in a location outside the forward path of movement of coolant rich solution from the reservoir to the vapor forming end of the liquid heat exchanger of the thermosiphon pump;

3. means for gradually returning the stored inhibitor rich solution to the forward path of movement of the coolant rich solution from the reservoir to the vapor forming end of the liquid heat exchanger of the thermosiphon pump after the refrigerating unit has been returned to a position having a permissible angle of inclination; and 4. means for diluting the concentration of the stored inhibitor rich solution after the refrigerating unit has been returned to a position having a permissible angle of inclination.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENT

The manner of operation of a two-temperature continuous cycle absorption refrigerator unit of known modern construction with pressure-equalizing auxiliary gas will be briefly explained with reference to FIG. 1. Additional detail regarding such units may be found in Althouse, *Modern Refrigeration and Air Conditioning* (1975), pp. 91–93, which disclosure is incorporated herein by reference.

Figure 1:
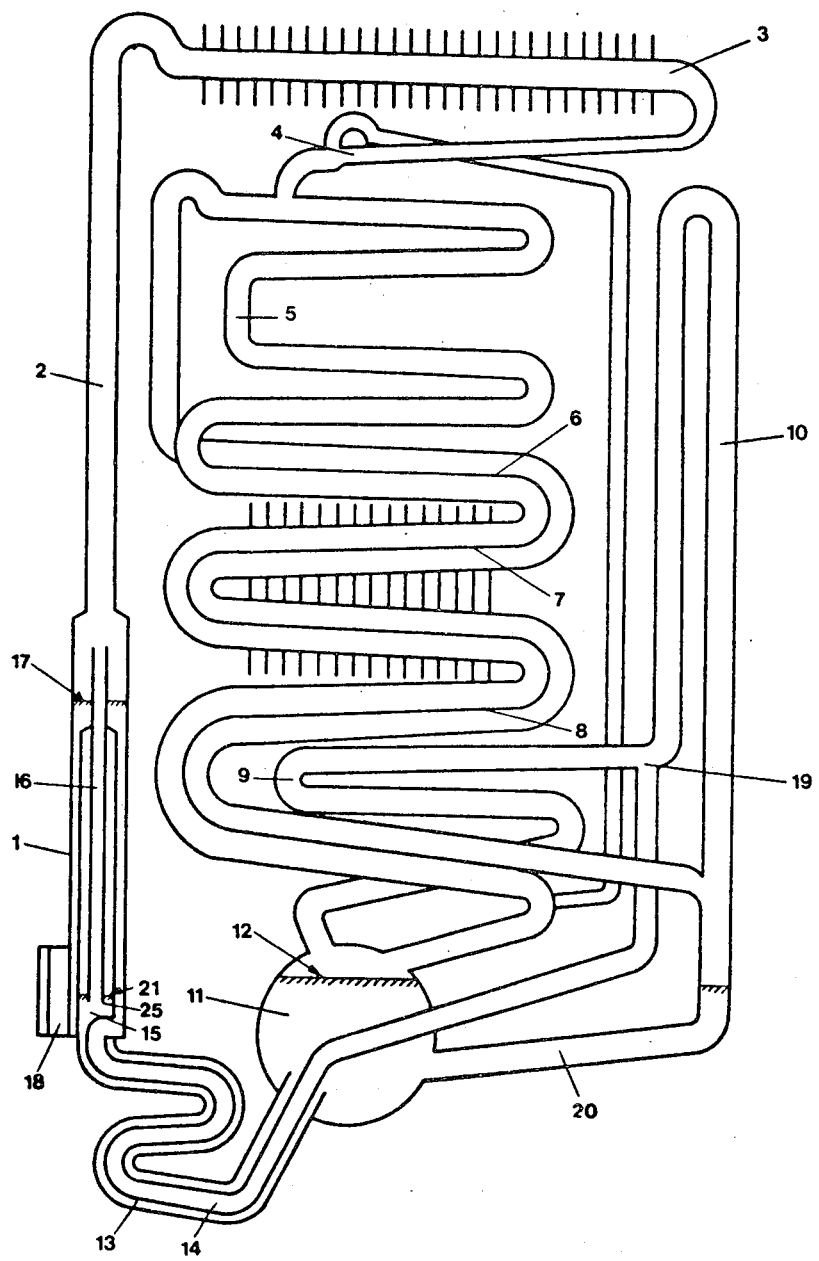
FIG. 1 is a diagram of a prior art refrigerating unit.

As shown in FIG. 1, the refrigeration unit comprises a generator 1 containing both a solution of water and a coolant (for example ammonia). The generator expels coolant vapor and passes it through conduit 2 into a condenser 3 where it condenses. The condensate flows through a precooling conduit 4, such as that described in Swiss Patent No. 454,192, into first evaporator section 5 where it evaporates by absorption of heat due to contact with the auxiliary gas (for example, hydrogen) which is flowing in the same direction. As a result of the low partial pressure of the coolant in the auxiliary gas, the evaporation in the evaporator section 5 takes place at a low temperature. In a subsequent counterflow gas-heat exchanger 6, an auxiliary gas (for example, hydrogen) which is lean in coolant is cooled to approximately the temperature of the evaporator section 5 by the giving off of heat to the auxiliary gas which is rich in coolant. The evaporation of the remaining coolant into the enriched auxiliary gas takes place in a second evaporator section 7. As a result of the increased partial pressure of the coolant in the auxiliary gas, the evaporation takes place in this region at a higher temperature. A subsequent counterflow gas heat exchanger 8 serves to cool the coolant-lean auxiliary gas coming from the absorber. The coolant-rich gas then passes into an absorber 9, where it comes into contact with the coolant-lean solution, flowing in counterflow, coming from the generator 1. As a result, the coolant vapor is withdrawn from the auxiliary gas by absorption into the solvent. The coolant-lean auxiliary gas now flows through a tube bend 10, which serves for the precooling of the coolant-lean auxiliary gas, and through the above-described sections 8, 7 and 6 to the evaporator section 5, where it again effects the evaporation of the coolant condensate coming from the precooling section 4.

The lean solution, which passes from the generator 1 into the upper part of the absorber 9, flows through the pipe coil 10, provided with a given gradient, into a reservoir 11 (as a coolant rich solution due to the coolant taken from the coolant rich auxiliary gas at 19) which, due to its geometrical proportions, is adapted to assure as constant as possible a liquid level 12 under normal operating conditions. From the collector 11 the coolant-rich solution passes through a forward path 13 of the liquid heat exchanger into a vapor-forming end 15 of the liquid heat exchanger. In counterflow to this, the hot coolant-lean solution flows in a return path 14 of the liquid heat exchanger from the generator 1 to the upper end 19 of the absorber 9. In the vapor-forming part of the liquid heat exchanger 15, which is heated indirectly by the source of heat 18 of the generator 1, a certain amount of coolant vapor is produced which serves to drive a thermosiphon pump 16. The amount by which the lower end 25 of the thermosiphon pump 16 lies below the liquid level 12 is termed the depth of immersion. The thermosiphon pump 16 is capable of pumping liquid only when a minimum depth of immersion exists. The minimum depth of immersion depends on the density and viscosity of the liquid to be pumped, the amount of vapor produced in the vapor-forming end of the liquid heat exchanger, and the delivery head of the pump. The latter is determined finally by the height of the absorber 9.

In the coolant-lean auxiliary gas which passes from the absorber 9 through the tube 10 into the gas heat exchangers 8 and 6, respectively, a certain proportion of solution (e.g. water and coolant) in vapor form is entrained out of the absorber 9. It is precipitated in part as condensate during the cooling in the gas heat exchangers 8 and 6, respectively, and passes by gravity into the conduit 20 and then into the reservoir 11.

In addition to the foregoing liquid and gaseous elements of the liquid and gas circuits, respectively, it is necessary, with the generally employed pairs of substances ammonia-water and hydrogen, to add a corrosion inhibitor. The corrosion inhibitor is normally a salt which is soluble in the solution.

Due to the construction of the above-described prior art refrigerating unit, a relatively large amount of coolant rich solution is supplied to the vapor forming end of the liquid heat exchanger of the thermosiphon pump from the absorber vessel when the refrigerator unit exceeds the permissible angle of inclination. As a result, an unlimited amount of inhibitor rich solution can be produced during this time. When the refrigerating unit is returned to a permissible angle of inclination, this inhibitor rich solution is immediately supplied to the vapor forming end of the liquid heat exchanger of the thermosiphon pump. If the level of inhibitor in this solution is sufficiently high, the thermosiphon pump will not be able to resume operation for the reasons noted above.

In order to avoid this problem, it is necessary to structurally modify the refrigerating unit in the region of the liquid circulation. These improvements, one possible variant of which is shown diagrammatically in FIG. 2, must satisfy the following requirements:

(1) It must be possible to store the solution obtained during the boiling-out phase in the vapor-forming end of the liquid heat exchanger 15. This solution is characterized by a very high content of anti-corrosive inhibitor and relatively low proportion of coolant. The solution being stored must be accumulated outside the forward path of the rich solution to the pump.

(2) A definite interruption of the feed of solution from the absorber vessel 11 to the pump must preferably take place when the refrigerator is inclined beyond the permissible angle of inclination.

(3) A time-delayed return of the separated solution into the solution circuit must take place after the refrigerator has returned again to a normal operating position.

The manner of operation of this new structural part will be described on the basis of the structural solution for the preventing of the disturbance which has been shown diagrammatically in FIG. 2. For this purpose, a U-tube 22, 26, 27 which is divided into three regions is provided. Each of the three regions carry out a specific function. A riser pipe 22 is represented by the collector-side region of the U-tube 22, 26, 27 which is located between the lower end of the forward path 24 and the inlet opening for the collector liquid 23. Adjacent the bottom thereof, there is provided a buffer volume 26, which is represented by the tube portion between the points 24 and 28. The leg of the U-tube which connects above point 28 serves to return the condensate into the buffer volume 26. The forward path 13 of the liquid heat exchanger must be so arranged that for every angle of inclination of the refrigerator which occurs in actual practice, a continuous gradient is present. This new arrangement operates as follows:

If the refrigerator is operated with an angle of inclination which is not permissible, a considerable amount of liquid accumulates within a short time in the liquid-conducting tubes. As a result, the liquid level 12 drops below the inlet opening 23. From this moment on, only the volume of solution present in the U-tube 22, 26, 27 is still in communication with the thermosiphon pump. Since the free liquid surface in the two tubes 22 and 27 is very small as compared with the liquid surface 12 in the reservoir 11, the level in these two tubes 22, 27 drops rapidly upon further removal of liquid by the termosiphon pump. This has the result that the liquid level 21 also drops below the vapor-forming zone of the liquid heat exchanger 15, whereupon no further removal of liquid by the thermosiphon pump takes place.

Figure 2:
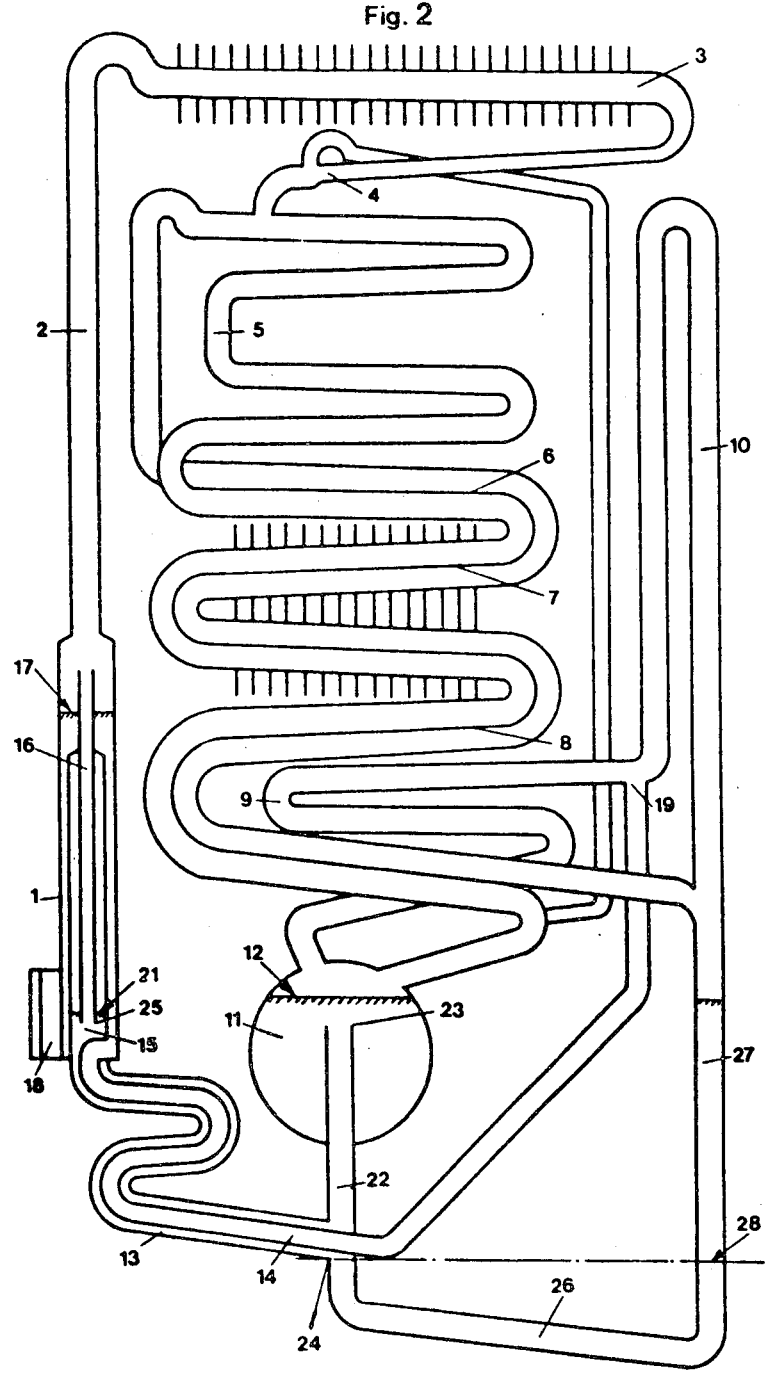
FIG. 2 is a diagram of a refrigerating unit constructed in accordance with the principles of the present invention.

The result of the removal of liquid from the reservoir 11 in accordance with FIG. 2 is that, in contra-distinction to the conventional removal shown in FIG. 1, only a small volume of liquid participates in the evaporation process in the vapor-forming end of the liquid heat exchanger 15, and accordingly also only a relatively small amount of solution of high inhibitor content and low coolant content is produced. As a result of the geometrical arrangement of the forward path 13, this heavy portion of solution sinks by gravity into the buffer volume 26 of the new structural part. Coolant-rich solution flows in counterflow thereto in the forward path 13 and takes the place of the heavy solution which has fallen away.

After the refrigerator has been returned to a permissible angle of inclination, accumulated liquid flows back into the absorber vessel 11, as a result of which the liquid level 12 again lies above the inlet opening 23 and the riser pipe 22 is thus filled with liquid. As a result, the liquid level 21 also rises in such a manner that the thermosiphon pump can resume its pumping action. In contradistinction to the arrangement shown in FIG. 1, the thermosiphon pump, due to the removal of the inhibitor-rich solution from the forward path, is supplied with coolant-rich solution of normal composition immediately upon the return of the unit to an angle less than the permissible angle of inclination. It is thus fully functionable. The inhibitor-rich solution present in the buffer volume 26 is diluted by the condensate which precipitates from the lean gas in tubes 6, 8 and 10 upon the normal operation of the refrigerator and, with suitable fluidic design of the buffer volume 26, is flushed out of same and mixed with the flow of solution from the absorber vessel 11 to the pump 16. Since the amount of condensate obtained is small as compared with the flow of solution, the reintroduction of the separated portion of the solution takes place so slowly that the concentration conditions in the forward path 13 change only slightly and thus the pumping action of the thermosiphon pump is not impaired.

The following may be noted with regard to the dimensioning of the individual parts of the present invention:

(a) The height of the inlet opening 23 must be such that it is lower than the level 12 during all variations of level of the liquid level 12 which take place during the operation of the unit within the permissible inclination. Only when the refrigerator is operated beyond the permissible inclination must the level 12 come below the opening 23.

(b) The free liquid surface in the tubes 22 and 27 should be as small as possible so that after the interruption of the feeding of liquid from the reservoir 11 only a small volume of liquid need be withdrawn by the pump until the liquid level comes below the vapor-forming region of the liquid heat exchanger 15 and the evaporating by the pump is completed.

(c) The buffer volume 26 must be of such shape that the entire inhibitor-rich solution which is produced during the evaporating phase by the thermosiphon pump can be collected and that it is fed by the stream of condensate produced upon normal operation, again in dilute concentration of the solution, from the absorber vessel 11 to the thermosiphon pump.

An absorption refrigerating unit designed in this manner operates satisfactorily even with a long continuing inclination which is greater than the permissible value, regardless of the capacity of the refrigerating unit. This is particularly advantageous with refrigerating units having large capacities.

A gas fired absorption refrigerator in a vehicle may be operated for long periods of time at an angle of inclination which exceeds the limit determined by the geometrical design of the refrigerating unit. In such cases, abnormal phenomena can occur in the region of the thermosiphon pump which provides the drive for the liquid circuit. This abnormal phenomena results from the fact that in the case of large angles of inclination of the unit, large quantities of liquid accumulate in the liquid circuit and the level of the liquid in the reservoir drops to such an extent that the inlet pressure of the thermosiphon pump is no longer sufficient for the pumping of the liquid. Since, however, vapor is still generated in the vapor-producing region of the liquid heat exchanger, the composition of the solution present in this region changes considerably. Particularly, strong enrichment of the nonvolatile corrosion inhibitor and strong impoverishment of readily volatile coolant take place during the evaporation phase. With the conventional removal and feeding of the coolant-rich solution from the reservoir to the pump, large quantities of the solution which is present in the reservoir are affected by the evaporation process. Most of the solution produced by the evaporation process remains in the forward path of the liquid heat exchanger. After the refrigerator unit is again at a permissible angle of inclination, the solution in the forward path of the liquid heat exchanger does not produce any pumping action due to its increased boiling point and density and cooling no longer takes place. The present invention obviates the foregoing problem by avoiding foregoing undesirable consequences when the refrigerator unit is placed in an impermissible inclination.

The present invention may be embodied in other specific forms without departing from the spirit or essential attributes thereof and, accordingly, reference should be made to the appended claims, rather than to the foregoing specification as indicating the scope of the invention.

What is claimed is:

1. In an absorption refrigerating unit of the type which circulates a coolant fluid and a solvent through a generator, a condenser, an evaporator, an absorber and an absorber vessel housing coolant rich solution which contains a corrosion inhibitor, said circulation being induced by a thermosiphon pump forming part of said generator, the combination comprising:

conduit means delivering a supply of said coolant rich solution from said absorber vessel to the vapor forming end of the liquid heat exchanger of said thermosiphon pump;

means for interrupting the supply of said coolant rich solution from said absorber vessel to said vapor forming end of said liquid heat exchanger after the angle of inclination of said absorption refrigerating unit exceeds a permissible angle of inclination at which said thermosiphon pump is able to pump liquid whereby only a limited amount of inhibitor rich solution can be produced during the period of time during which said unit exceeds said permissible angle of inclination.

2. The absorption refrigerating unit of the combination of claim 1, further including means for storing the so produced inhibitor rich solution in a location outside the path of movement of said coolant rich solution from said absorber vessel to said vapor forming end of said liquid heat exchanger.

3. The combination of claim 2, further including means for gradually returning said stored inhibitor rich solution to said forward path of movement of said coolant rich solution from said absorber vessel to said vapor forming end of said liquid heat exchanger after said refrigerating unit has been returned to a position having a permissible angle of inclination.

4. The combination of claim 3, further including means for diluting the concentration of said stored inhibitor rich solution after said refrigerating unit has been returned to a position having a permissible angle of inclination.

5. The combination of claim 2, wherein said storage means comprises a tubular member.

6. The combination of claim 3, wherein one end of said storing means is coupled to said conduit means and a second end of said storing means is coupled to a condensation conduit (10) of said refrigerating unit in which coolant rich solution is condensed in such a manner that said coolant rich solution is added to said inhibitor rich solution.

7. The combination of claim 1, wherein said means for interrupting the supply of said coolant rich solution comprises a standpipe extending into said absorber vessel, and a condensate return line (27) communicating with said standpipe, wherein the cross-section of said standpipe and said return line are substantially smaller than the surface area of said coolant rich solution in said absorber vessel so that when said refrigerating unit exceeds said permissible angle of inclination and a critical level is reached in said absorber vessel, an abrupt cessation in the supply of said coolant rich fluid from said absorber vessel to said vapor forming end of said liquid exchanger is obtained.

8. The combination of claim 1, wherein said conduit means discharges into a U-shaped tube structure comprising a condensate return line (27), storage means (26) and a riser pipe (22) which extends into said absorber vessel, said conduit means discharging into said U-shaped tube at approximately the location of transition between said storage means and said riser pipe.

* * * * *